(12) United States Patent
Chang et al.

(10) Patent No.: US 6,986,667 B2
(45) Date of Patent: Jan. 17, 2006

(54) INSET MECHANISM FOR ELECTRONIC ASSEMBLIES

(75) Inventors: Yu-Hsiu Chang, Hsinchu (TW); Hao-Liang Chao, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 10/789,316

(22) Filed: Feb. 27, 2004

(65) Prior Publication Data

US 2005/0191874 A1 Sep. 1, 2005

(51) Int. Cl.
*H01R 12/00* (2006.01)
*H05K 1/00* (2006.01)

(52) U.S. Cl. ........................................ 439/65
(58) Field of Classification Search ................ 439/68, 439/65; 361/761, 784, 803
See application file for complete search history.

(56) References Cited

U.S. PATENT DOCUMENTS 3,377,514 A * 4/1968 Ruehlmann et al. ........ 361/767

FOREIGN PATENT DOCUMENTS

| JP | 5-145249 | 6/1993 |
|---|---|---|
| JP | 11-94957 | 4/1999 |

* cited by examiner

*Primary Examiner*—Javaid H. Nasri
(74) *Attorney, Agent, or Firm*—Duane Morris LLP

(57) ABSTRACT

This invention relates generally to an apparatus and a method for securing electronic components, such as semiconductors and LCD devices in a mechanical assembly through an interconnection formed by a tongue-and-groove securing structure. A first element comprises a holder with electronic components mounted thereon that couples into a second element comprising a bisected frame section having two opposing grooves. The invention also embodies a method of assembly which mounts an electronic device on an insertion means, having a lower tongue and an upper tongue into a grooved frame such that sliding the lower tongue into the groove frame on the lower side situates the tongue and subsequent sliding of the tongue in the direction of the groove frame on the upper side, causes the groove to receive the upper tongue, thereby locking the tongue into the assembly.

20 Claims, 3 Drawing Sheets

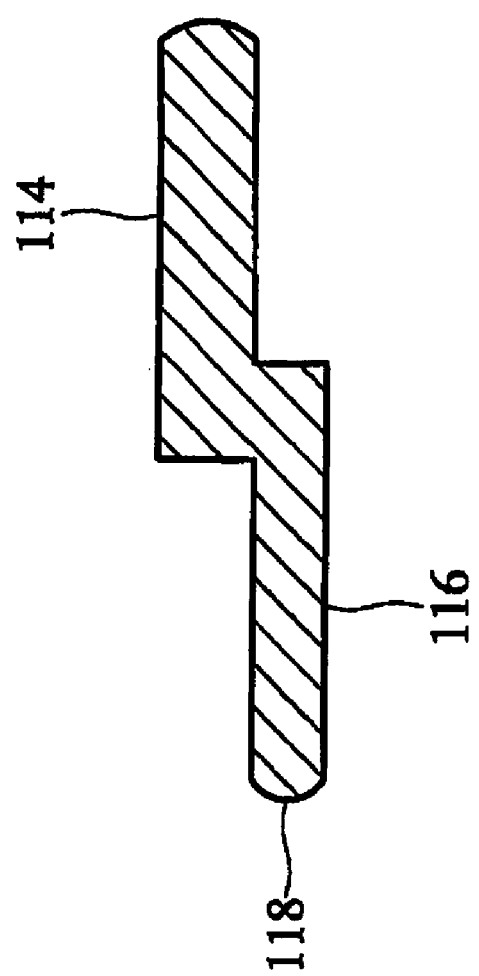

INSET MECHANISM FOR ELECTRONIC ASSEMBLIES

BACKGROUND OF THE INVENTION

1. Field of the Invention

The invention relates generally to a method and an apparatus for maintaining and releasing an interconnection between an electronic device and mechanical assembly to which it attaches. More specifically the invention applies to an electronic device for driving illumination means within a liquid crystal display or LCD panel.

2. Description of Related Art

As the demand for smaller, more powerful electronic systems increase, system manufacturers require better methods of efficient assembly while decreasing the size of the electronic components within the electronic system. An areas which has cause printed circuit board (PCB) designers problems concerns ways of mounting and servicing LCD assemblies.

There are but a few ways of mounting electronic components such as LCD modules and inverters to such assemblies as liquid crystal displays. For example, inverters can be joined to frames using adhesives. In other instances, the devices are joined to frames fixed by a self taping screw or a screw and associated nut. The options in mounting are even fewer when the modules must be removable for accomplishing the initial assembly operations and thereafter repair operations.

Existing methods, designs and materials exhibit poor long term reliability and the later because it utilizes fastening hardware, such as screws, consume excessive package volume. Either solution typically results in higher assembly costs. In many instances the time expended in module removal does not justify the repair and the item is scrapped. The electronics industry, notably the LCD industry would benefit from a method of assembly and disassembly that would be quick and reliable and also allow for the reuse of the major portion of the electronic device.

SUMMARY OF THE INVENTION

Electronic components, such as semiconductors and LCD devices are rigidly maintained in a mechanical assembly through an interconnection formed by a tongue-and-groove securing structure.

A holder with electronic components mounted thereon is formed from a tongue-and-groove mounting device, which couples into a bisected frame section having two opposing grooves in a horizontal direction. The holder is comprised of two opposing tongues, a first upper tongue portion and a second lower tongue portion, the total length of which, is less than an opening provided by the total length of the two opposing grooves in a horizontal direction.

The invention herein also comprises a method of assembly whereby interfitting a tongue having a lower tongue and an upper tongue, upon which is mounted an electronic device, into a grooved frame having a lower side and an upper side, such that sliding the lower tongue into a groove frame on a lower side situates the tongue and subsequent sliding of the tongue in the direction of the groove frame on the upper side, causes the groove to receive the upper tongue, thereby locking the tongue into the assembly.

The electronic component module generally requires considerable assembly time and thereafter requires a high degree of mechanical integrity when connected. Therefore, it is an object of the present invention to provide an inset mechanism for an electronic device such as an inverter or LCD module that is focused on saving assembly cost and on providing a high level of mechanical durability.

BRIEF DESCRIPTION OF THE DRAWINGS

The invention is best understood from the following detailed description when read in connection with the accompanying drawing. The various features of the drawings are not exhaustively specified. On the contrary, the various features may arbitrarily be expanded or reduced for clarity. Included in the drawing are the following figures:

FIG. 1*a* is a plan view of the invention illustrating the insertion position of the electronic module.

FIG. 1*b* is a plan view of the invention illustrating the first position of the insertion of the electronic module.

FIG. 1*c* is a plan view of the invention illustrating the final position of the insertion of the electronic module.

"FIG. 2 is a side view of an alternative embodiment of a tongue portion of the device of FIG. 1;"

DETAILED DESCRIPTION OF THE INVENTION

Electronic components, such as semiconductors and LCD devices are rigidly maintained in a mechanical assembly through an interconnection formed by a tongue-and-groove securing structure.

A holder with electronic components mounted thereon is formed from a tongue-and-groove mounting device, which couples into a bisected frame section having two opposing grooves in a horizontal direction. The holder is comprised of two opposing tongues, a first upper tongue portion and a second lower tongue portion, the total length of which, is less than an opening provided by the total length of the two opposing grooves.

As shown on FIG. 1*a*, FIG. 1*b* and FIG. 1*c*, a tongue-and-groove assembly 100 couples an electronic module 105 and a holder 180 into a bisected grooved frame 160 composed of two sections 170*a* and 170*b*. As shown on FIG. 1*a*, the bisected groove frame sections 170*a* and 170*b* include, an upper groove portion 130 and a lower groove portion 190.

The total length of the holder 180 containing the upper tongue portion 114 and a lower tongue portion 116, is less than the opening provided by the total length of the groove portion 130 and 190 extended in a horizontal direction.

The electronic module 105 may be, by way of example, a semiconductor device or LCD, which is mounted on the holder 180 and typically bonded by a bonding material 150, such as a suitable adhesive.

The assembly 100 comprises: the frame 160 configured with the grooved frame members 170*a* and 170*b,* wherein the member 170*b* forms the upper side, which in FIG. 1*a* is to the right side, and wherein the member 170*a* forms the lower side, which in FIG. 1*a* is to the left side of the grooved frame respectively; and a holder having a lower tongue 116 fit into a lower channel such as a groove 190 and an upper tongue 114 fit into a upper channel or groove 130, respectively. The upper tongue 114 top surface 122 has mounted thereon an electronic device 105. The lower tongue 116 is inserted into the lower groove 190 of the frame, 160 on the lower side 170*a* and the opposing upper tongue 114 is brought into contact with the right side of the frame 160 on the upper side 170*b,* top surface 140. Thereafter holder 180 is slid in a rightward horizontal direction into the lower groove 190 thereby interfitting the tongues 116 and 114 respectively into the frame members 170a and 170b respectively.

Figure 1A:
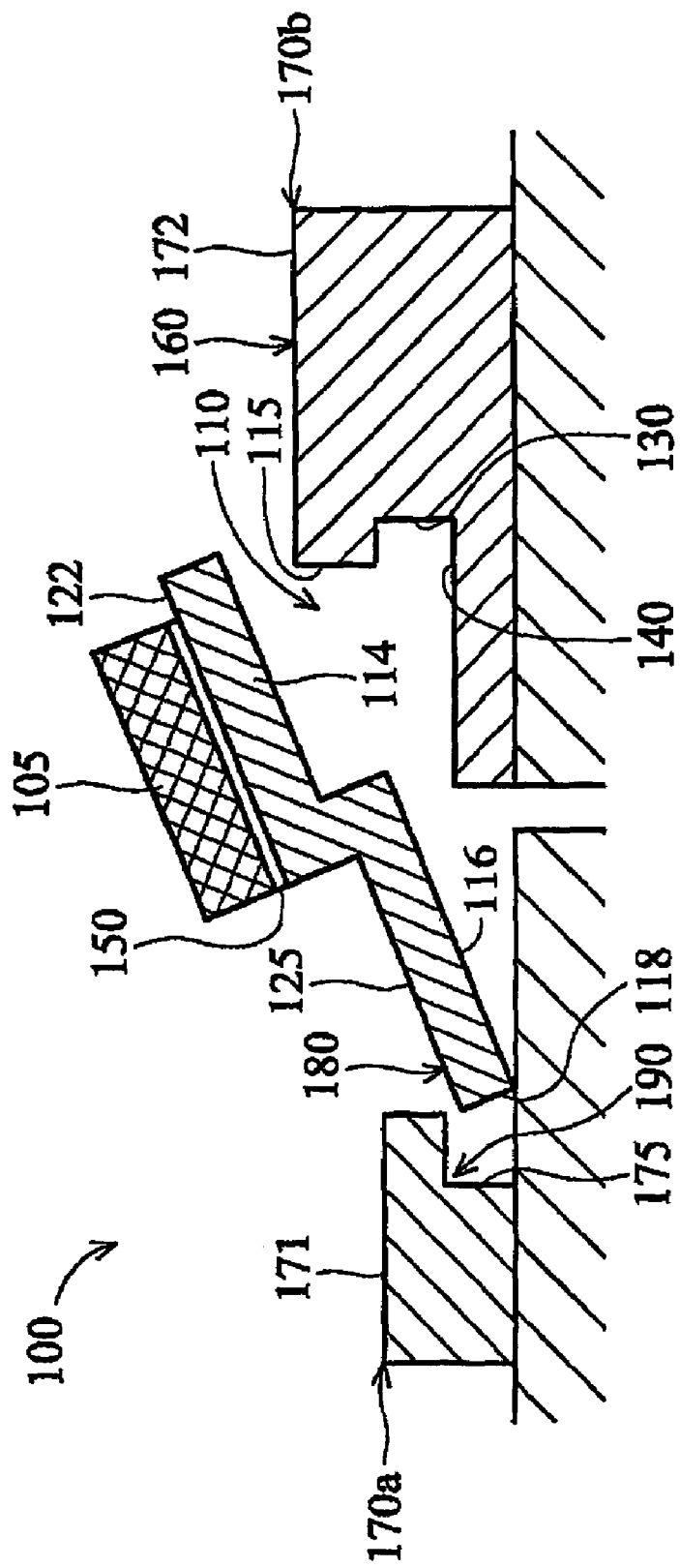
Figure 1B:
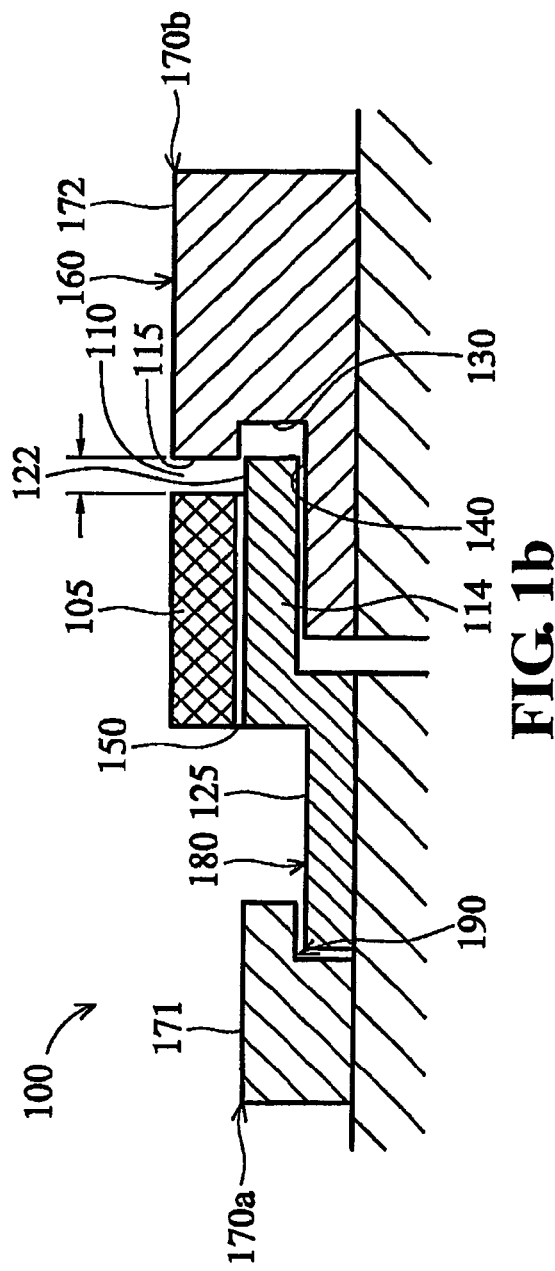
Figure 1C:
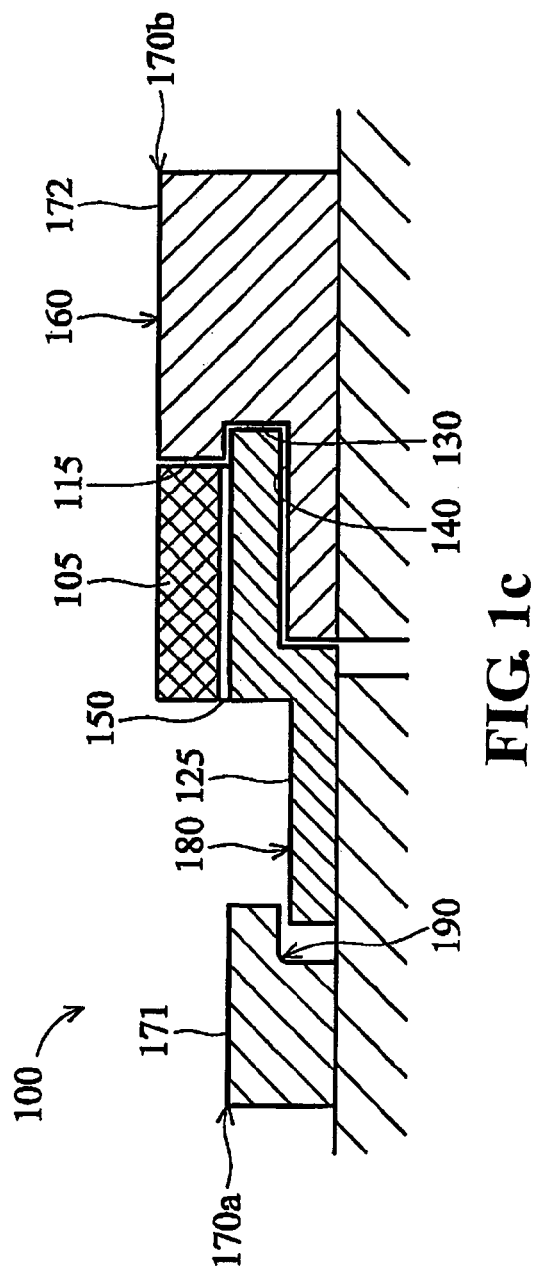

The assembly of the holder 180 into the groove frame sections 170a and 170b requires that the holder 180 edge 118, of the lower tongue portion 116 be inserted into the lower grove 190 and set onto the upper groove surface 140. In a next step as shown in FIG. 1b. the holder 180 lower tongue 116 is inserted into the lower groove position abutting a vertical wall 175. This situates the tongue at one end such that in a final step shown in FIG. 1c the holder 180 is then slide into the direction of the groove connector portion 170b, until the electronic module 105 abuts a vertical wall 115.

Additionally, the holder 180 lower tongue portion 116 has a top surface 125 which fits securely into the lower grove 190. The lower tongue top surface 125 is in the same plane as the upper groove surface 140. Once the device 105 abuts the wall 175 or in a proximate position within 0.5 mm to 1.0 mm, the device 105 is essentially locked into place.

In a reversible operation, the holder 180 as inserted may be removed by sliding the holder 180 in the direction of the groove 170a towards the wall 175. When a space 110 discloses the edge of the upper tongue 114 then the holder 180 can be releasably detached from the bisected groove frame 170a–170b.

As indicated the assembly of the holder 180 into the groove frame sections 170a and 170b requires that the holder 180 edge 118, of the lower tongue portion 116 be inserted into the lower groove 190 and set onto the upper groove surface 140. However, the lower tongue portion 116 and corresponding edge 118 may be substantially rectangular in cross section or alternatively beveled or in a conical section (see FIG. 2) for ease of insertion. Likewise, the upper tongue portion 114 and its edge may be substantially rectangular in cross section or alternatively beveled or in a conical section (see FIG. ) for ease of insertion. To further assist in the ease of insertion, the vertical wall 115 may be substantially rectangular in cross section or alternatively beveled or in a conic section for ease of insertion.

The invention herein also comprises a method of assembly whereby interfitting the holder 180 having a lower tongue 116 and an upper tongue 114, upon which is mounted the electronic device 105, into the grooved frame 160 such that sliding the lower tongue 116 into a groove frame 160 on a lower side situates the tongue 116 and subsequent sliding of the tongue 114 in the direction of the groove frame 160 on the upper side 170b, causes the groove frame 160 to receive the upper tongue 114, thereby locking the holder into the assembly.

More particularly the method of assembly comprises the steps of: mounting the device 105 onto the surf ace 122 holder 180; interfitting holder 180, having the lower tongue 116 and the upper tongue 114, into the grooved frame 160 composed of two sections 170a and 170b, having a lower side and an upper side, sliding the lower tongue 116 into the groove frame 160 section 170a on the lower side, situating the lower tongue 116 at one end 175, and sliding the upper tongue 114 in the direction of the groove frame 160 section 170b on the upper side, so as to receive the upper tongue 114 thereby locking the surface into position.

To disengage the device, employs the steps of: sliding of the insertion means 180 in the direction of a groove frame 170a on the lower side, and lifting the insertion means 180 in a direction away from the grove frame 170a–170b, causing the device 105 to disengage from the assembly.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed is:

1. An assembly, comprising:
   a grooved frame having a lower side recess and an upper side recess, and an interfitting tongue having a lower tongue portion and an upper tongue portion, and further having an electronic device mounted thereon,
   whereby the lower side recess is configured to contact the lower tongue portion, and the upper side recess is configured to engage the upper tongue portion, such that when the lower tongue portion contacts the lower side recess, the interfitting tongue is movable in a first direction within the lower side recess so that the upper side recess engages the upper tongue portion to thereby lock the interfitting tongue to the grooved frame.

2. The assembly in claim 1 wherein the lower tongue portion is substantially a rectangular shape in cross section.

3. The assembly in claim 1 wherein the lower tongue portion is substantially a conic shaped cross section.

4. The assembly in claim 1 wherein the upper tongue portion is substantially a rectangular shape in cross section.

5. The assembly in claim 1 wherein the upper tongue portion is substantially a conic shaped cross section.

6. The assembly of claim 1, wherein the lower tongue portion has a first frame contacting surface and the upper tongue portion has a second frame contacting surface, the first and second frame contacting surfaces being non-coplanar.

7. The assembly of claim 6, wherein the grooved frame has a lower tongue contacting surface configured to receive the lower tongue portion and an upper tongue contacting surface configured to receive the upper tongue portion.

8. The assembly of claim 7, wherein the first and second fame contacting surfaces are parallel.

9. The assembly of claim 6, wherein the first and second tongue portions are connected by a central tongue portion, the electronic device being mounted to the central tongue portion.

10. A method of mounting a device onto a surface comprising the steps of: interfitting a means having a lower tongue and an upper tongue, into a grooved frame having a lower side recess and an upper side recess;
    sliding the lower tongue into engagement with the lower side recess; and
    sliding the means within the lower side recess in the direction of the upper side recess, to engage the upper tongue with the upper side recess thereby locking the means into position in the grooved frame.

11. The method in claim 10, comprising the additional step of sliding the means in the direction of the lower side recess, thereby releasably detaching the means from the grooved frame.

12. The method of claim 10, wherein the lower tongue has a first frame contacting surface and the upper tongue has a second frame contacting surface, the first and second frame contacting surfaces being non-coplanar.

13. The method of claim 12, wherein the grooved frame has a lower tongue contacting surface configured to contact the lower tongue and an upper tongue contacting surface configured to contact the upper tongue.

14. The method of claim 12, wherein the first and second frame contacting surfaces are parallel.

15. The method of claim 12, wherein the first tongue and second tongue are connected by a central tongue portion, and an electronic device is mounted on the central tongue portion.

16. A method of assembly comprising the steps of:
   mounting an electronic device onto an insertion means said insertion means having a tongue comprising a lower tongue portion and an upper tongue portion;
   interfitting the insertion means into a grooved frame having a lower side recess and an upper side recess;
   engaging the lower tongue portion with the lower side recess in the grooved frame; and
   sliding the tongue within the lower side recess in the direction of the upper side recess, causing the groove to receive the upper tongue portion, thereby locking the insertion means to the grooved frame.

17. The method of assembly of claim 16 further comprising: sliding the insertion means in the direction of the lower side recess, and lifting the insertion means in a direction away from the groove frame, causing the insertion means to disengage from the grooved frame.

18. The method of claim 16, wherein the lower tongue portion has a first frame contacting surface and the upper tongue portion has a second frame contacting surface, the first and second frame contacting surfaces being non-coplanar.

19. The method of claim 18, wherein the grooved frame has a lower tongue contacting surface configured to receive the lower tongue portion and an upper tongue contacting surface configured to receive the upper tongue portion.

20. The method of claim 18, wherein the first and second frame contacting surfaces are parallel.

\* \* \* \* \*